(12) United States Patent
Kim et al.

(10) Patent No.: US 9,967,343 B2
(45) Date of Patent: May 8, 2018

(54) METHOD FOR PROVIDING INTERNET OF THINGS SERVICE

(71) Applicant: KOREA ELECTRONICS TECHNOLOGY INSTITUTE, Seongnam-si, Gyeonggi-do (KR)

(72) Inventors: Jae Ho Kim, Yongin-si (KR); Kwang Ho Won, Yongin-si (KR); Sang Shin Lee, Yongin-si (KR); Il Yeup Ahn, Namyangju-si (KR); Min Hwan Song, Seoul (KR); Jae Seok Yoon, Yongin-si (KR)

(73) Assignee: KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 108 days.

(21) Appl. No.: 14/414,023

(22) PCT Filed: Oct. 16, 2012

(86) PCT No.: PCT/KR2012/008418
§ 371 (c)(1),
(2) Date: Jan. 9, 2015

(87) PCT Pub. No.: WO2014/010784
PCT Pub. Date: Jan. 16, 2014

(65) Prior Publication Data
US 2015/0201022 A1 Jul. 16, 2015

(30) Foreign Application Priority Data
Jul. 11, 2012 (KR) .................. 10-2012-0075462

(51) Int. Cl.
*G06F 15/16* (2006.01)
*H04L 29/08* (2006.01)
(Continued)

(52) U.S. Cl.
CPC .............. *H04L 67/125* (2013.01); *G06F 8/61* (2013.01); *G06F 9/5061* (2013.01); *H04L 67/12* (2013.01);
(Continued)

(58) Field of Classification Search
CPC ....... H04L 67/125; H04L 67/12; H04L 67/34; H04L 67/42; H04L 9/32; G06F 8/61;
(Continued)

(56) References Cited

U.S. PATENT DOCUMENTS

2006/0168178 A1* 7/2006 Hwang ............... H04L 12/2803
709/223
2011/0176528 A1 7/2011 Lu
(Continued)

FOREIGN PATENT DOCUMENTS

KR 10-2011-0072234 A 6/2011
KR 10-2012-0061337 A 6/2012
(Continued)

OTHER PUBLICATIONS

Jan Audestad et al., "Connected Objects Platform Specification, Version I", R&I Research Report, Feb. 18, 2009, pp. 1-74, Telenor ASA.
(Continued)

*Primary Examiner* — Bryan Lee
*Assistant Examiner* — Oluwatosin Gidado
(74) *Attorney, Agent, or Firm* — Hauptman Ham, LLP (57) ABSTRACT

A method for providing an IoT service is provided. The method for providing the IoT service may provide the IoT service by using a D-platform, a P-platform, an M-platform, and an S-platform, and thus may provide an open type IoT service. Therefore, an IoT service developer may reduce the
(Continued)

time and cost required to develop and an IoT service user may access the IoT service intuitively and systematically.

9 Claims, 8 Drawing Sheets

(51) Int. Cl.
    *H04W 4/00*     (2018.01)
    *G06F 9/445*     (2018.01)
    *G06F 9/50*     (2006.01)
    *H04L 9/32*     (2006.01)
    *H04W 12/00*     (2009.01)

(52) U.S. Cl.
    CPC ............. *H04L 67/34* (2013.01); *H04W 4/003* (2013.01); *H04W 4/005* (2013.01); *H04L 9/32* (2013.01); *H04W 12/00* (2013.01)

(58) Field of Classification Search
    CPC ..... G06F 9/5061; H04W 4/003; H04W 4/005; H04W 12/00
    USPC ........................................ 709/203, 217, 223
    See application file for complete search history.

(56) References Cited

U.S. PATENT DOCUMENTS

| 2012/0079092 | A1 | 3/2012 | Woxblom et al. | |
| 2013/0042244 | A1* | 2/2013 | Li | H04L 67/34 718/100 |
| 2013/0080898 | A1* | 3/2013 | Lavian | G06F 3/01 715/728 |
| 2016/0087933 | A1* | 3/2016 | Johnson | G06F 17/30861 709/245 |

FOREIGN PATENT DOCUMENTS

| KR | 10-2012-0071722 A | 7/2012 |
| WO | 2011134318 A1 | 11/2011 |

OTHER PUBLICATIONS

"Report on potential for standardization of M2M (Machine-to-Machine communications) at ETSI", M2M ADHOC Group Report VI3, European-Telecommunications Standards Institute (ETSI), Nov. 12, 2008, pp. 1-50.

European Search Report for corresponding European Patent Application No. 12880825.0 dated Dec. 11, 2015.

International Search Report for PCT/KR2012/008418 dated Mar. 22, 2013.

* cited by examiner

_METHOD FOR PROVIDING INTERNET OF THINGS SERVICE_

CROSS-REFERENCE TO RELATED APPLICATION

This application is a National Stage of International Application No. PCT/KR2012/008418, filed on Oct. 16, 2012, and claims priority from Korean Patent Application No. 10-2012-0075462 filed on Jul. 11, 2012, the disclosure of which is incorporated herein in its entirety by reference.

TECHNICAL FIELD

Methods and apparatuses consistent with exemplary embodiments relate to a method for providing an Internet of Things (IoT) service, and more particularly, to a method for systematically providing an IoT service regarding various things.

BACKGROUND

The term "Internet of Things (IoT) was first introduced at the MIT Auto-ID Labs in 1998. Thereafter, an annual report titled "The Internet of Things" was published at ITU-T in 2005 and preannounced that the IoT would be the most fundamental frame containing all structures of future information technology (IT) industry revolution. This report defined the IoT as "a new information communication infrastructure that connects all kinds of things existing in the world through networks and enables persons and things to communicate with one another anytime and anywhere". That is, the IoT can be regarded as an infrastructure to realize a ubiquitous space. Such a ubiquitous space starts by implanting computing devices equipped with specific functions into environments and things and making the environment or the things intelligent.

The IoT service provides more convenient and safer life to us. Therefore, various mobile service providers and terminal manufacturers are focusing on development of terminals and services for supporting the IoT emerging as a next generation mobile service.

However, the IoT is at an early stage and has not established a detailed model for providing the service. Therefore, there is a need for a detailed method for providing such an IoT service.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an open-type software platform for providing an IoT service. The proposed open-type IoT software platform can reduce the time and cost required to develop an IoT service and thus many developers can participate in the provision of the IoT service.

One or more exemplary embodiments also provide a method for easily discovering lots of IoT devices, connecting them, and providing a service.

An open type software platform for providing such a service is divided into four types of platforms on the basis of functions. The open type IoT software platform includes a D-platform to connect things to the Internet to develop the open type IoT software platform, a P-platform to register an IoT device in a global environment and provide a search service, an S-platform which is an app store platform for an IoT application service environment in which IoT applications are expected to increase geometrically, and an M-platform to provide various mash-up services.

According to an aspect of an exemplary embodiment, there is provided a method for providing an IoT service, the method including: accessing, by a browser executed in a user's mobile device, a P-platform; providing, by the P-platform, information on IoT devices to the browser; displaying, by the browser, the IoT devices; downloading, by the mobile device, an IoT application of an IoT device selected by the user from among the displayed IoT devices from an S-platform; and executing, by the mobile device, the IoT application and communicating with the IoT device.

The communicating may include executing, by the mobile device, the IoT application and exchanging information with the IoT device through an M-platform or exchanging information by directly communicating with the IoT device.

The communicating may include executing, by the mobile device, the IoT application and transmitting a control command input by the user to the IoT device.

The method may further include executing, by the mobile device, the IoT application, accessing an M-platform, and receiving a mash-up service related to the IoT device.

The downloading may include: transmitting, by the browser, information the IoT device selected by the user from among the displayed IoT devices to the S-platform; transmitting, by the S-platform, a list of IoT applications of the IoT device selected by the user to the browser; displaying, by the browser, the list of IoT applications; and requesting, by the browser, an IoT application selected by the user from the S-platform and downloading the IoT application.

The displaying the IoT devices may include listing, by the browser, the IoT devices in a form of icons on a map, or listing the IoT devices in a form of a text list.

The providing the information may include: authenticating, by the P-platform, the user; and, when the user is determined to be a valid user, providing, by the P-platform, the information on the IoT devices to the browser.

The method may further include accessing, by the mobile device, an IoT webpage for controlling the IoT device, and controlling an operation of the IoT device.

According to various exemplary embodiments, the IoT software platform can provide the IoT service using the D-platform, the P-platform, the M-platform, and the S-platform, and thus an IoT service developer can reduce the time and cost required to develop and an IoT service user can access the IoT service intuitively and systematically.

BRIEF DESCRIPTION OF THE DRAWINGS

The above and/or other aspects of the invention will become and more readily appreciated from the following description of the exemplary embodiments, taken in conjunction with the accompanying drawings of which.

DETAILED DESCRIPTION OF EXEMPLARY EMBODIMENTS OF THE INVENTION

Reference will now be made in detail to the present exemplary embodiments of the present disclosure, examples of which are illustrated in the accompanying drawings, wherein like reference numerals refer to the like elements throughout. The exemplary embodiments are described below in order to explain the present disclosure by referring to the figures.

Figure 1:
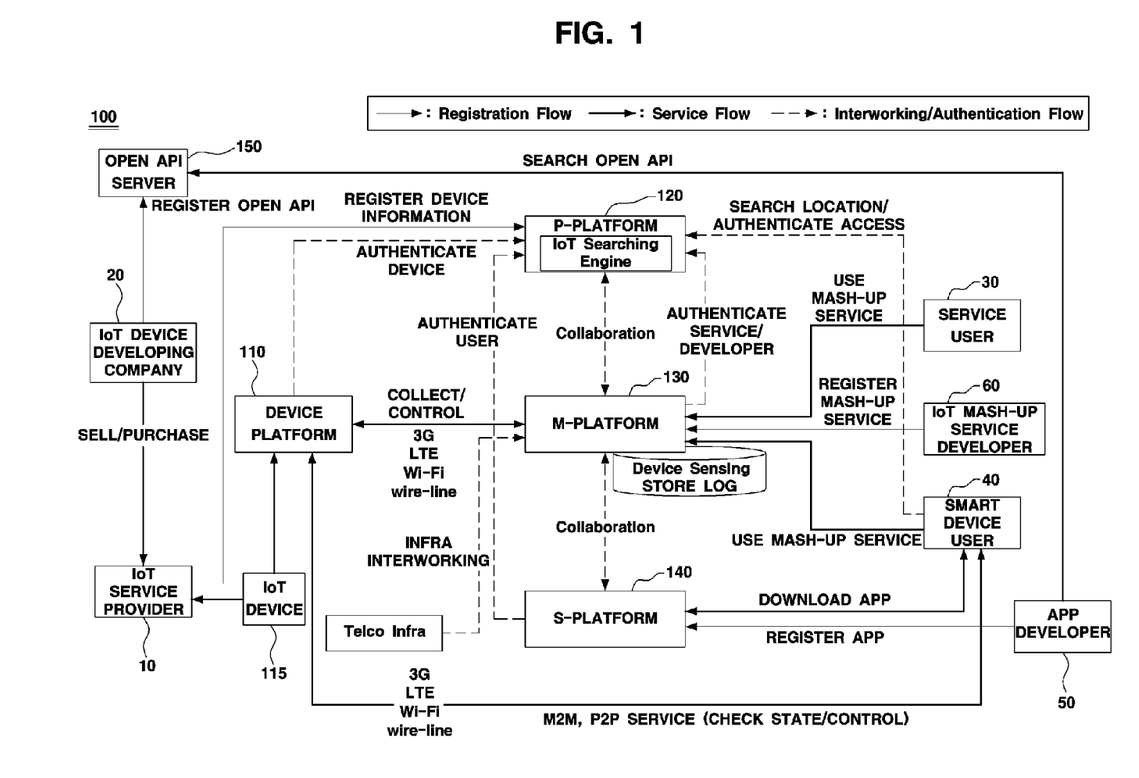
FIG. 1 is a view showing a configuration of an IoT software platform according to an exemplary embodiment of the present disclosure.

FIG. 1 is a view showing a configuration of an IoT software platform 100 according to an exemplary embodiment of the present disclosure. As shown in FIG. 1, the IoT software platform 100 includes a D-platform 110, a P-platform 120, an M-platform 130, and an S-platform 140.

The D-platform 110 refers to a software platform which is installed at an IoT device 115 side, and the P-platform 120, the M-platform 130, and the S-platform 140 refer to software platforms which are installed at a server computer side independently or all together.

The D-platform 110 is an abbreviation for "Device platform" and is directly installed in the IoT device 115 or is installed in an IoT adaptor mounted in the IoT device 115 to interwork with the P-platform 120 and the M-platform 130, and interworks with a smart device through an IoT application and an IoT website.

The IoT device 115 recited herein refers to general things to which IoT is applied (for example, a television (TV), a mobile phone, a refrigerator, a cleaner, a washing machine, a vending machine, and the like).

The IoT adaptor is mounted in the IoT device 115 to allow the thing to use IoT communication. The IoT adaptor includes a communication module to communicate through at least one of short-distance wireless communication, Wi-Fi, Ethernet, 3G, and Long Term Evolution (LTE), and the D-platform 110 installed in the IoT adaptor provides various functions to the IoT adaptor to perform IoT communication.

The P-platform 120 is an abbreviation for "Planet platform" and performs functions such as managing the IoT device 115, managing the user, monitoring the IoT device 115, discovering the IoT device 115, and the like. Specifically, the P-platform 120 receives information on the IoT device 115 from an IoT service provider 10, and registers the IoT device 115. In this case, the information on the IoT device 115 includes a device ID, a device name, a model name, a manufacturer, location information, device state information, and the like, and includes an address which is necessary for connecting to the IoT device 115 (for example, an Internet Protocol (IP) address, a Mobile Station International Subscriber Dictionary Number (MSISDN), and the like).

In addition, the P-platform 120 authenticates a user who accesses the S-platform 130 to register and download an IoT application for the IoT service. To authenticate the user, the P-platform 120 contains personal information such as a user's ID/PW or phone number.

In addition, the P-platform 120 may authenticate a developer who develops and registers an IoT-related mash-up service or a service user who uses the mash-up service.

In addition, the P-platform 120 may authenticate an IoT service access of an IoT service user using an application of a smart device (for example, a smartphone, tablet, and the like).

The M-platform 130 is an abbreviation for "Mash-up platform" and transmits a control command of a service user input through an IoT application or an IoT webpage to the IoT device 115 by communicating with the D-platform 110.

In addition, the M-platform 130 registers an IoT mash-up service which was developed by a mash-up service developer 60. That is, the mash-up service developer 60 develops an IoT mash-up service and registers the same at the M-platform 130. In this case, the mash-up service developer 60 may develop the IoT mash-up service using an IoT open Application Programming Interface (API) provided by an open API server 150.

The IoT devices 115 periodically transmit their generated data to the M-platform 130 and the M-platform 130 collects the data generated in the IoT devices 115 and stores the data as a log to use it to provide various IoT mash-up services to the service user.

In addition, the M-platform 130 may charge for the use of the IoT mash-up service and may store brief information on the IoT devices (for example, an ID, an IP address, and the like).

The S-platform is an abbreviation for "Store-platform", and provides an application store function to provide an IoT application for the IoT service to the service user. To achieve this, the S-platform 140 provides an application searching function. The S-platform 140 provides a function of searching an IoT application that can use an IoT function of a corresponding IoT device 115 on the basis of the ID of the IoT device 115.

To achieve this, the S-platform 140 registers an IoT application which was developed by the IoT application developer 50.

The open API server 150 performs a function of managing and providing an open API related to the IoT service. Specifically, the developing company of the IoT device 115 develops the open API for the IoT device 115 at the time of manufacturing the IoT device 115, and registers and stores the relevant open API at the open API server 150. Then, the open API server 150 registers, stores, and manages various open APIs regarding the IoT devices 115 developed by various developing companies.

In addition, the open API server 150 provides a stored open API to a developer who intends to develop an IoT service-related website, a mash-up service site, and an application. Accordingly, when the developer develops the IoT service-related website, the mash-up service site, and the application, the developer receives a relevant open API from the open API server 150 and develops an IoT service using the received open API.

For example, when the manufacturer of the IoT device registers the open API which provides state information on the IoT device 115 (for example, information on whether the IoT device is out of order or not) at the open API server 150, the developer searches the open API which provides the state information from the API server 150 and implements the function of inquiring about the state of the IoT device 115 for the IoT service-related website, the mash-up service site, and the IoT application using the open API.

The IoT service user may directly access the IoT device 115 using the IoT application which was downloaded into a smart device 40 which is a kind of mobile device, and may use the IoT service. In this case, the IoT device 115 may be connected with the smart device 40 through relay of the M-platform 130 or may be directly connected with the smart device 40 through Peer to Peer (P2P) communication to provide the IoT service. In this case, the D-platform 110 of the IoT device 115 may indirectly communicate with the IoT application of the smart device 40 through relay of the M-platform 130 or may directly communicate with the IoT application through P2P communication.

The IoT software platform 100 configured as described above may provide various IoT services by making the D-platform 110, the P-platform 120, the M-platform 130, and the S-platform 140 interwork with one another.

Figure 2:
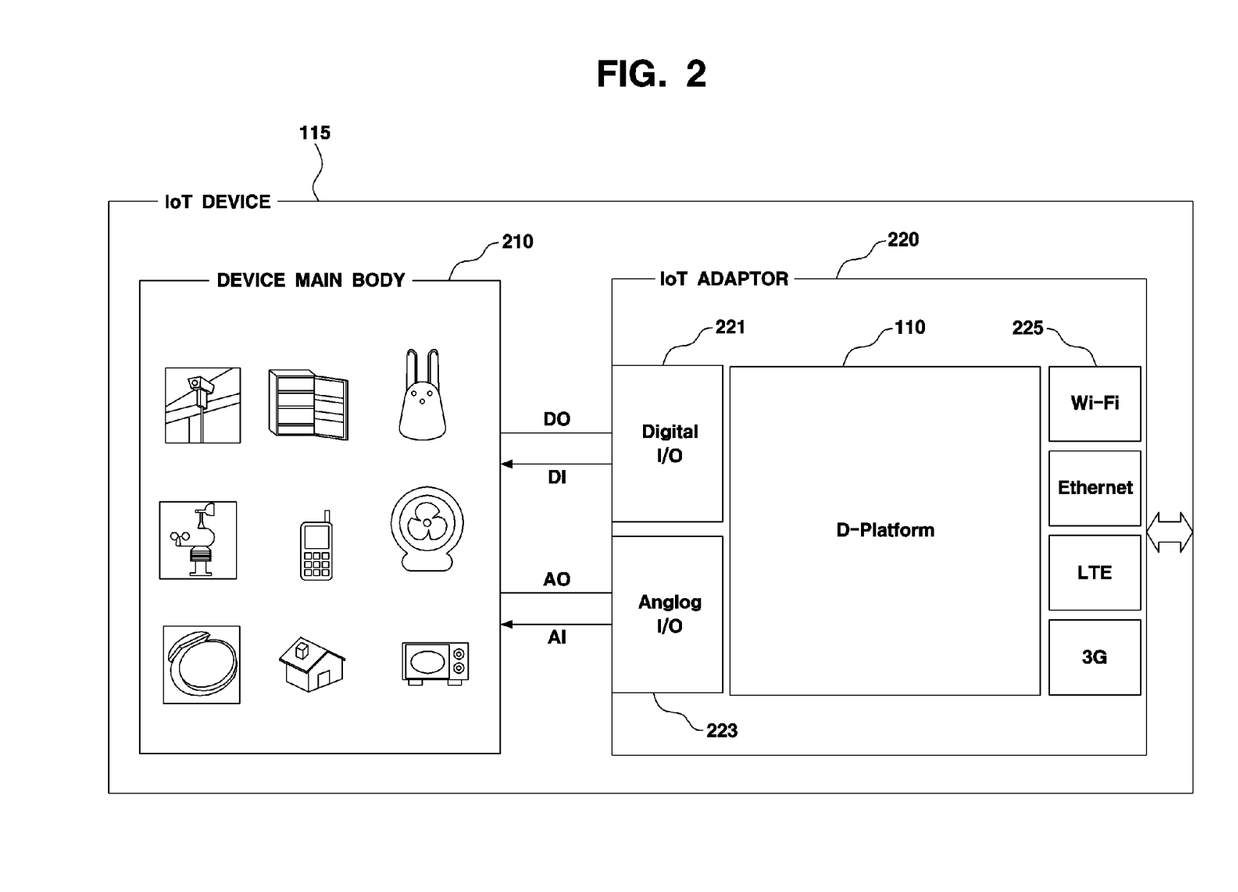
FIG. 2 is a block diagram showing a configuration of an IoT device according to an exemplary embodiment of the present disclosure.

FIG. 2 is a block diagram showing a configuration of an IoT device 115 according to an exemplary embodiment of the present disclosure. As shown in FIG. 2, the IoT device 115 includes a device main body 210 and an IoT adaptor 220.

The device main body 210 provides original functions of the IoT device 115. For example, when the IoT device 115 is a mobile phone, the device main body 210 is a mobile phone main body. When the IoT device 115 is a lamp, the device main body 210 is a lamp main body.

The IoT adaptor 220 is mounted in the IoT device 115 to support IoT communication to be enabled. That is, the IoT device 115 can communicate with an external device through the IoT adaptor 220.

The IoT adaptor 220 includes a digital input/output (I/O) 221, an analogue I/O 223, a D-platform 110, and a communication module 225.

The digital I/O 221 transmits and receives digital signals between the device main body 210 and the IoT adaptor 220. In addition, the analogue I/O 223 transmits and receives analogue signals between the device main body 210 and the IoT adaptor 220.

The D-platform 110 may be installed in the IoT adaptor 220 as shown in FIG. 2. However, the D-platform 110 may be directly installed in the IoT device 115 as described above. In any case, the D-platform 110 interworks with the P-platform 120 and the M-platform 13 and interworks with a smart device through an IoT application and an IoT website.

The communication module 225 includes a communication module to communicate through at least one of short-distance wireless communication, Wi-Fi, Ethernet, 3G, LTE, and the like. However, the communication module 225 is not limited to the above-mentioned communication methods and may include communication modules for various other communication methods to provide the IoT service.

Figure 3:
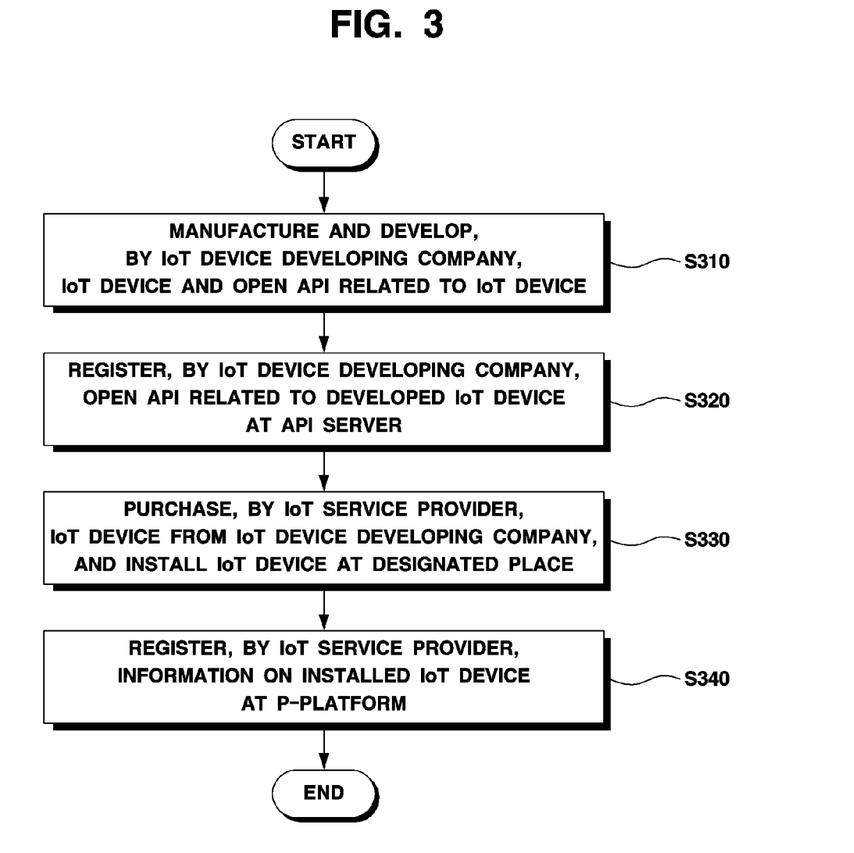
FIG. 3 is a flowchart to explain a process of registering an IoT device according to an exemplary embodiment of the present disclosure.

Hereinafter, a process of registering an IoT device 115 will be explained with reference to FIG. 3. FIG. 3 is a flowchart to explain a process of registering an IoT device 115 according to an exemplary embodiment of the present disclosure.

First, an IoT device developing company 20 manufactures and develops an IoT device 115 and an open API related to the IoT device 115 (S310). The IoT device developing company 20 registers the open API related to the developed IoT device 115 at an open API server 150 (S320).

An IoT service provider 10 purchases the IoT device 115 from the IoT device developing company 20 and installs the IoT device 115 at a designated place (S330).

The IoT service provider 10 registers information on the installed IoT device 115 at the P-platform 120 (S340). In this case, the information on the IoT device 115 includes a device ID, a device name, a model name, a manufacturer, location information, device state information, and the like, and includes an address which is necessary for connecting to the IoT device 115 (for example, an IP address, an MSISDN, and the like).

Through the above-described process, the IoT device 115 is registered at the P-platform 120 as a device to receive an IoT service, and is registered as an IoT service target device.

Figure 4:
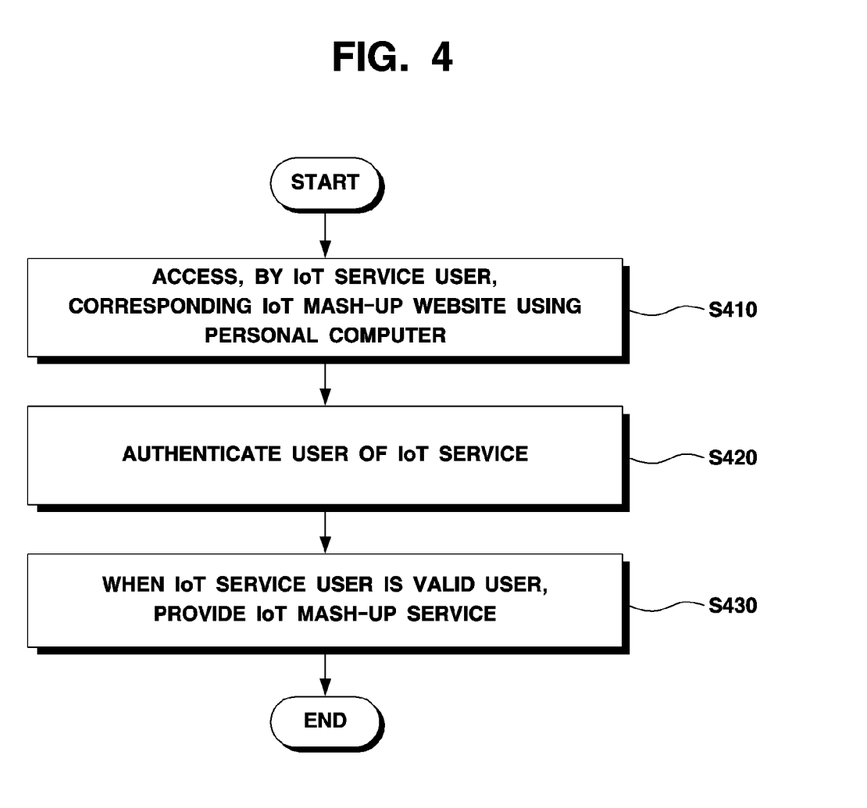
FIG. 4 is a flowchart to explain a process in which an IoT service user uses an IoT mash-up service using a personal computer according to an exemplary embodiment of the present disclosure.

Hereinafter, a process in which an IoT service user 30 uses an IoT mash-up service will be explained with reference to FIG. 4. FIG. 4 is a flowchart to explain a process in which an IoT service user 30 uses an IoT mash-up service using a personal computer according to an exemplary embodiment of the present disclosure.

First, the IoT service user 30 accesses a corresponding IoT mash-up website using a personal computer to use an IoT mash-up service (S410). The IoT mash-up website is a website which provides an IoT mash-up service, and provides the IoT mash-up service independently or by interworking with various portal sites (for example, Naver, Daum, Yahoo, Google, and the like).

When the IoT service user 30 tries to access an IoT mash-up service on the IoT mash-up website, the M-platform 130 performs an authentication operation to determine whether the IoT service user 30 is authorized to use the IoT mash-up service or not by interworking with the P-platform 130 (S420).

When the IoT service user 30 is a valid user, the M-platform 130 provides the IoT mash-up service to the IoT service user 30 through the personal computer (S430).

Figure 5:
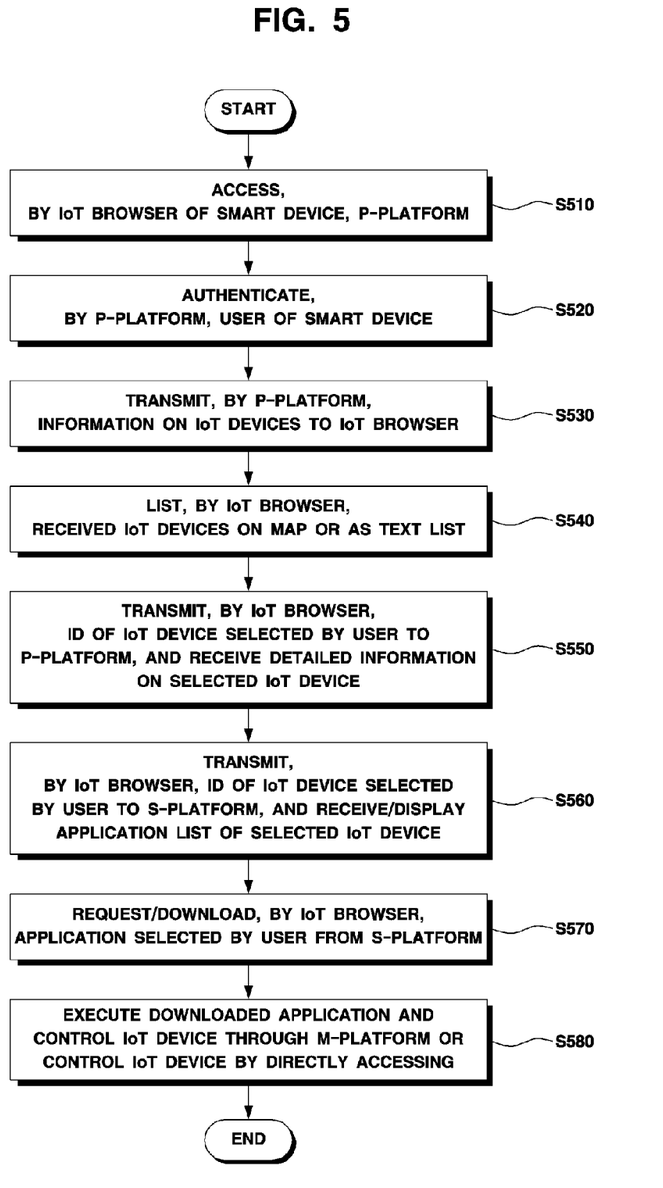
FIG. 5 is a flowchart to explain a process in which a smart device user uses an IoT service using a smart device according to an exemplary embodiment of the present disclosure.

Hereinafter, a process in which a user of a smart device 40 uses an IoT service will be explained with reference to FIG. 5. FIG. 5 is a flowchart to explain a process in which a user of a smart device 40 uses an IoT service using the smart device 40 according to an exemplary embodiment of the present disclosure.

When the user of the smart device 40 executes an IoT browser using the smart device 40, the IoT browser accesses the P-platform 120 (S510) and the P-platform 120 performs an authentication operation to determine whether the user of the smart device 40 is authorized to use the IoT service or not (S520).

When the user of the smart device 40 is a valid user, the P-platform 120 transmits information on IoT devices to be displayed on the IoT browser (S530), and the IoT browser lists the IoT devices received from the P-platform 120 (S540).

In step S540, the IoT devices may be listed in the form of icons on a map or in the form of a text list.

When one of the IoT devices listed in step S540 is selected by the service user, the IoT browser transmits the ID of the selected IoT device to the P-platform 120 and receives detailed information on the selected IoT device 115 from the P-platform 120 (S550). The detailed information received may be displayed on the IoT browser at the request of the user of the smart device 40.

In addition, the IoT browser transmits the ID of the selected IoT device to the S-platform 140, and receives a list of applications regarding the selected IoT device 115 from the S-platform 140 and displays the list (S560). An application displayed in step S560 may be an application for remotely controlling the selected IoT device 115 and receiving a mash-up service regarding the selected IoT device 115.

Next, when one of the applications in the application list displayed in step S560 is selected by the service user, the IoT browser requests the selected application from the S-platform 140 and downloads the application (S570).

Thereafter, the smart device 40 executes the application downloaded in step S570 and controls the operation of the IoT device 115 (S580).

Specifically, the smart device 40 may execute the downloaded application, access the D-platform 110 mounted in the IoT device 115 through the M-platform 130, and then control the operation of the IoT device 115.

When the M-platform 130 is not necessary according to a service, the smart device may execute the application downloaded in step S570, directly access the D-platform 110 mounted in the IoT device 115, and control the operation of the IoT device 115.

In addition, the smart device may execute the application downloaded in step S570 and may receive an IoT mash-up service from the M-platform 130.

Through the above-described process, the IoT software platform 100 may provide the IoT service through the application by making the D-platform 110, the P-platform 120, the M-platform 130, and the S-platform 140.

In FIG. 5, the smart device 40 executes the downloaded application, accesses the D-platform 110 mounted in the IoT device 115, and then controls the operation of the IoT device 115, or accesses the M-platform 130 and receives the IoT mash-up service.

However, the smart device 40 may access an IoT webpage for controlling the IoT device 115 and providing the IoT mash-up service rather than executing the downloaded application, and may control the operation of the IoT device 115 or receive the IoT mash-up service.

In addition, in the above-described exemplary embodiment, the IoT device is selected through the IoT browser. However, this should not be considered as limiting. For example, the IoT device may be discovered/selected by directly inputting an ID or name of the IoT device, or may be selected by discovering the IoT devices in each category. In addition, the IoT device may be selected by acquiring the ID of the IoT device from a QR code attached to the IoT device, or may be selected by acquiring the ID by communicating with the IoT device through short-distance communication such as NFC, Zigbee, Bluetooth, and the like.

Figure 6:
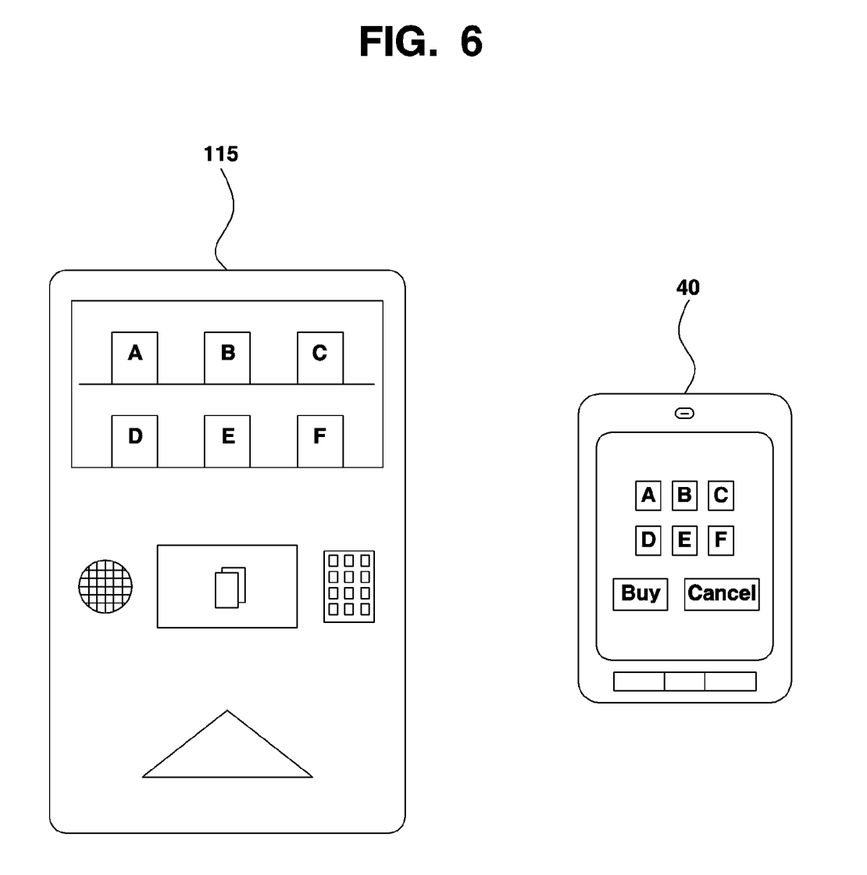
FIG. 6 is a view showing a vending machine and a smart device to which an IoT service is applied according to an exemplary embodiment of the present disclosure.

Hereinafter, an example of an IoT service will be explained with reference to FIG. 6. FIG. 6 is a view showing a vending machine 115 and a smart device 40 to which an IoT service is applied according to an exemplary embodiment of the present disclosure.

The vending machine 115 is an IoT device and has the D-platform 110 directly installed therein or installed in the IoT adaptor.

A result of selecting the vending machine 115 through an IoT browser of the smart device 40 by an IoT service user and downloading and executing an application for controlling the vending machine 115 is displayed on a screen of the smart device 40 of FIG. 6.

In addition, a manager may access the D-platform 110 of the vending machine 115 through the M-platform 130 of the smart device 40 using the executed application, and may check inventory and state of the vending machine 115.

In addition, the smart device 40 may be communicably connected with the D-platform 110 of the vending machine 115 directly without passing through the M-platform 130, and may purchase a product by controlling the operation of the vending machine 115.

Figure 7:
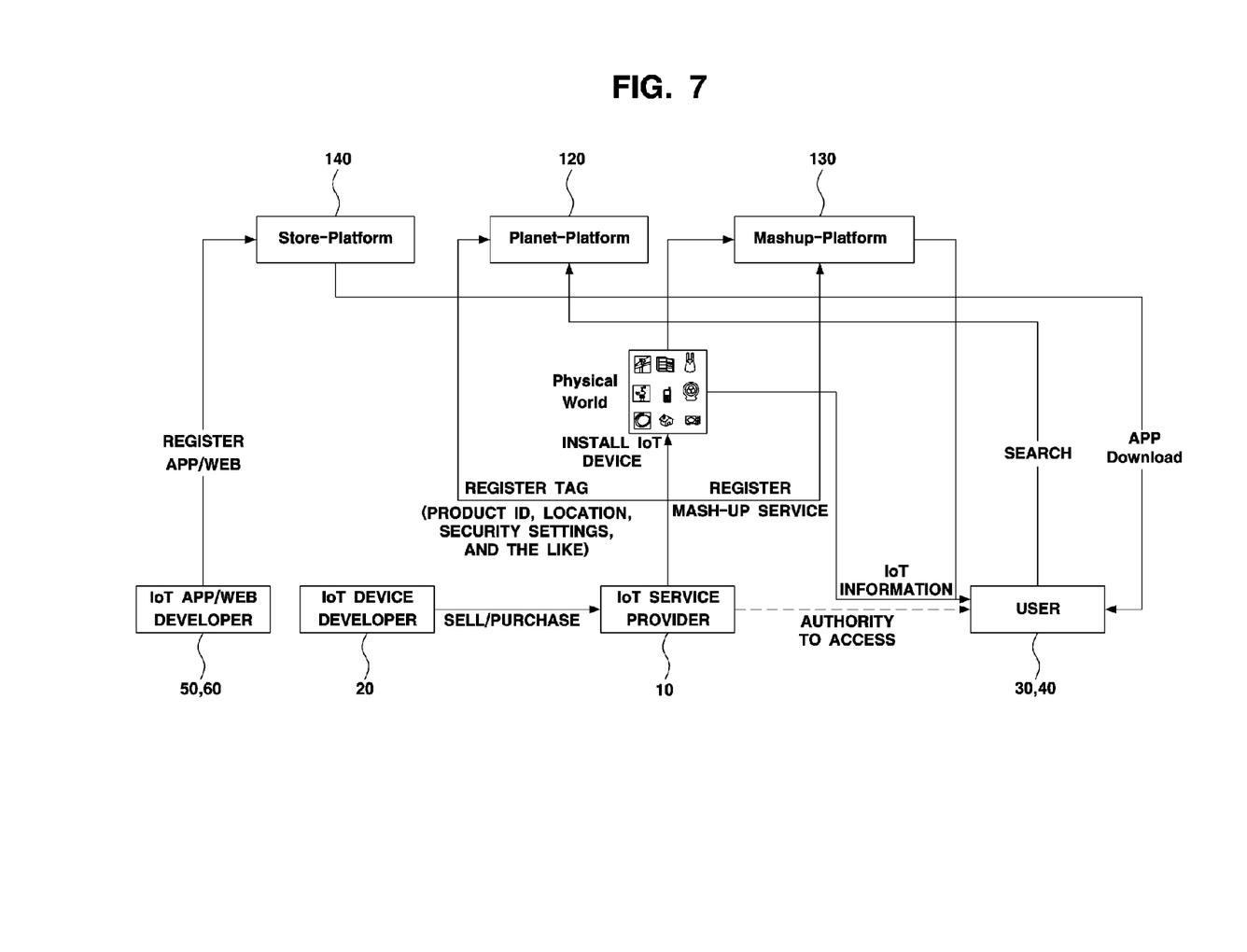
FIG. 7 is a view showing a framework of an IoT service based on an IoT software platform according to an exemplary embodiment of the present disclosure.

FIG. 7 is a view showing a framework of an IoT service based on the IoT software platform 100 according to an exemplary embodiment of the present disclosure.

FIG. 7 illustrates process 1 of registering the IoT application developed by the IoT application/web developer 50, 60 at the S-platform 140 and registering the IoT website, and process 2 of purchasing, by the IoT service provider 10, the IoT device 115 from the IoT device developing company 20, installing the IoT device 115, registering information on the IoT device 115 at the P-platform 120, and registering the IoT service and the IoT mash-up service at the M-platform 130, as described above.

In addition, FIG. 7 illustrates processes of the smart device 40, that is, process 1 of executing the IoT browser, accessing the P-platform 120, discovering the IoT devices, and selecting an IoT device, process 2 of accessing the S-platform 140, receiving a list of applications of the selected IoT device, and downloading a selected application, process 3 of executing the downloaded application and controlling the IoT device 115 through the M-platform 130, and process 4 of receiving the IoT mash-up service through the M-platform 130.

Figure 8:
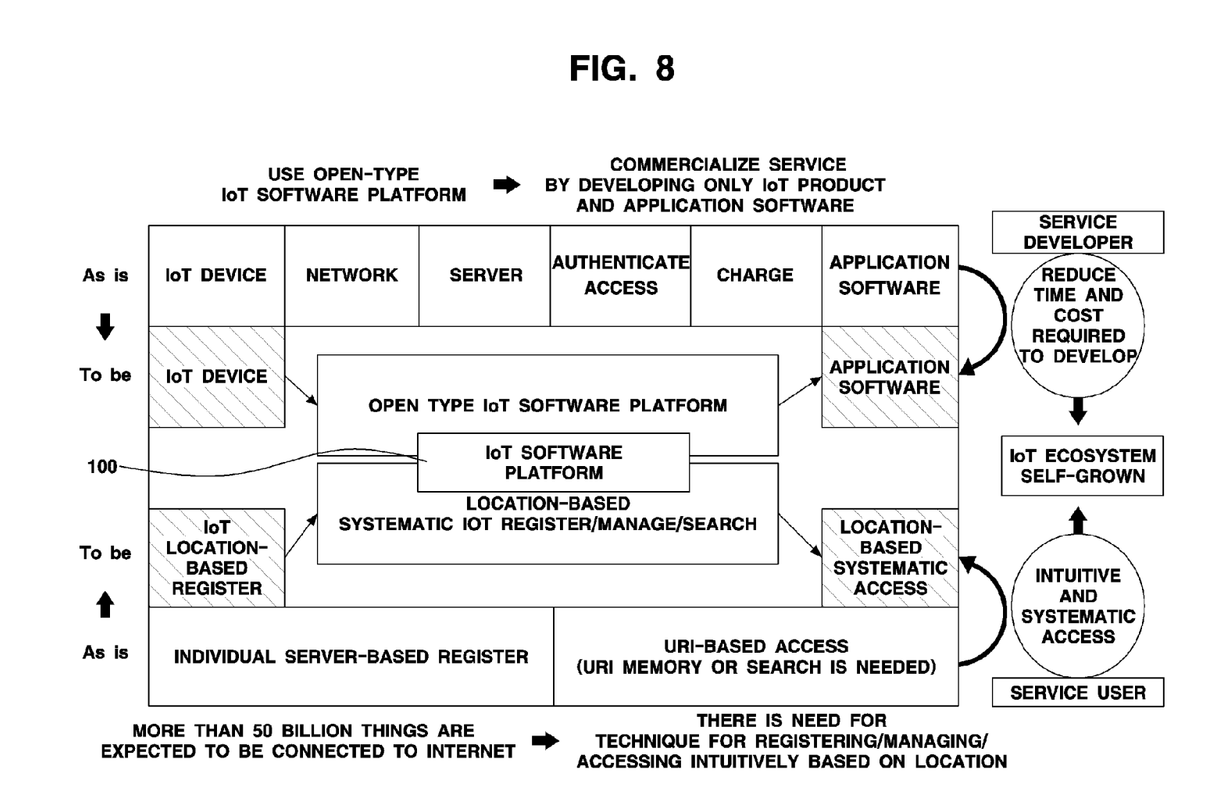
FIG. 8 is a view showing a result of comparing an IoT service ecosystem according to an exemplary embodiment of the present disclosure and that of a prior art.

FIG. 8 is a view showing comparison of an IoT service ecosystem according to an exemplary embodiment and that of a prior art.

As shown in FIG. 8, in the prior art, service developers should develop software in many stages such as an IoT device, a network, a server, access authentication, charging, application software, and the like. In addition, in the prior art, service users should register themselves on an individual server basis and should access an IoT service on the basis of URI, which may cause inconvenience.

However, when the IoT software platform 100 according to exemplary embodiments is used, software in the middle stages such as a network, a server, access authentication, charging and the like provide their functions by means of the IoT software platform 100. Accordingly, service developers have only to develop an IoT device, and an application program and an application related to the IoT service. In addition, the service user may select and control the IoT device on the basis of location.

According to various exemplary embodiments, the IoT software platform 100 can provide the IoT service using the D-platform, the P-platform, the M-platform, and the S-platform, and thus can provide an open type IoT service. Therefore, an IoT service developer can reduce the time and cost required to develop and an IoT service user can access the IoT service intuitively and systematically.

The IoT software platform 100, the D-platform 110, the P-platform 120, the M-platform 130, and the S-platform 140 are not limited by their names and can be applied to any of software, electronic device, or system corresponding to corresponding functions.

In addition, the IoT software platform 100, the D-platform 110, the P-platform 120, the M-platform 130, and the S-platform 140 may have various forms such as library, software solution, software package, software framework, individual software, and the like rather than the software platform form.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for providing an Internet of Things (IoT) service, the method comprising:
   accessing, by a browser executed in a mobile device, a first platform over an internet;
   providing, by the first platform, information on IoT devices to the browser over the internet;
   displaying, by the browser, the IoT devices;
   downloading, by the mobile device, an IoT application of an IoT device selected by a user from among the displayed IoT devices from a second platform via the internet; and
   executing, by the mobile device, the downloaded IoT application and communicating, by the executed IoT application, with the selected IoT device over the internet,
   wherein the downloading comprises;
      transmitting, by the browser, information on the selected IoT device to the second platform,
      transmitting, by the second platform, a list of IoT applications of the selected IoT device,
      displaying, by the browser, the transmitted list of IoT applications, and
      requesting, by the browser, an IoT application selected by the user from the transmitted list of IoT applications from the second platform and downloading the selected IoT application from the second platform via the internet.

2. The method of claim 1, wherein the executing and communicating comprises
   executing, by the mobile device, the downloaded IoT application and
   communicating, by the executed IoT application, with the selected IoT device through a third platform over the internet or directly communicating, by the executed IoT application, with the IoT device over the internet.

3. The method of claim 1, wherein the executing and communicating comprises
   executing, by the mobile device, the IoT application and
   transmitting, by the executed IoT application, a control command input by the user to the selected IoT device over the internet.

4. The method of claim 1, further comprising:
   accessing, by the executed IoT application, a third platform over the internet, and
   receiving, by the mobile device, a mash-up service related to the selected IoT device from the accessed third platform.

5. The method of claim 1, wherein the displaying the IoT devices comprises listing, by the browser, the IoT devices in a form of icons on a map, or listing the IoT devices in a form of a text list.

6. The method of claim 1, wherein the providing the information comprises:
   authenticating, by the first platform, the user; and
   when the user is determined to be a valid user, providing, by the first platform, the information on the IoT devices to the browser over the internet.

7. The method of claim 1, further comprising accessing, by the mobile device, an IoT webpage for controlling the selected IoT device, and controlling an operation of the selected IoT device.

8. A method of managing an Internet of Things (IoT) service, the method performed by a processor of a mobile device, the method comprising:
   accessing, through a browser executed in the mobile device, a first platform over an internet;
   receiving, from the accessed first platform, information on a plurality of IoT devices registered in the internet;
   displaying, through the executed browser, a list of the plurality of IoT devices based on the received information;
   downloading, through the executed browser and from a second platform via the internet, an IoT application of an IoT device selected by a user from the displayed list of the plurality of IoT devices;
   executing the downloaded IoT application; and
   communicating with the selected IoT device using the downloaded IoT application over the internet,
   wherein the downloading comprises;
      transmitting, through the executed browser over the internet, information on the selected IoT device to the second platform,
      receiving, from the second platform via the internet, a list of IoT applications of the selected IoT device,
      displaying the received list of IoT applications on the executed browser,
      transmitting a request of an IoT application selected by the user to the second platform over the internet, and
      downloading the selected IoT application from the second platform via the internet.

9. The method of claim 8, further comprising:
   accessing, through the executed IoT application, a third platform over the internet; and
   receiving, from the accessed third platform, a mash-up service related to the selected IoT device via the internet.

* * * * *